United States Patent [19]
Kehl

[11] Patent Number: 5,114,168
[45] Date of Patent: May 19, 1992

[54] BOAT TRAILER OR KIT

[76] Inventor: Charles W. Kehl, 11466 Irvington, Warren, Mich. 48093

[21] Appl. No.: 776,681

[22] Filed: Oct. 11, 1991

Related U.S. Application Data

[63] Continuation of Ser. No. 369,609, Jun. 21, 1989, abandoned.

[51] Int. Cl.$^5$ ............................................. B60P 3/10
[52] U.S. Cl. .................................. 280/414.1; 280/477; 114/344
[58] Field of Search ............... 280/414.1, 414.2, 414.3, 280/477, 479.2, 479.3; 114/344; 410/2, 3; 414/482, 529, 536

[56] References Cited

U.S. PATENT DOCUMENTS

| | | | |
|---|---|---|---|
| 2,636,745 | 4/1953 | Cartwright | 280/414.1 |
| 2,657,934 | 11/1953 | Linneman | 280/414.3 |
| 2,810,589 | 10/1957 | Tarleton | 280/414.1 |
| 3,169,782 | 2/1965 | Columbus | 280/479.2 |
| 3,765,703 | 10/1973 | Voelkerding et al. | 280/477 |
| 3,797,681 | 3/1974 | Brettrager | 280/414.1 |
| 3,885,146 | 5/1975 | Whitley | 280/414.1 |
| 4,114,920 | 9/1978 | Boettcher | 280/414.1 |
| 4,262,922 | 4/1981 | Nelson | 280/414.1 |
| 4,313,264 | 2/1982 | Miller | 280/477 |
| 4,641,598 | 2/1987 | Hodges | 114/344 |
| 4,666,176 | 5/1987 | Sand | 280/477 |
| 4,684,145 | 8/1987 | Tingley | 114/344 |
| 4,715,768 | 12/1987 | Capps | 414/529 |
| 4,754,998 | 7/1988 | LeJuerrne | 280/414.1 |

Primary Examiner—Charles A. Marmor
Assistant Examiner—A. M. Boehler
Attorney, Agent, or Firm—Harness, Dickey & Pierce

[57] ABSTRACT

An improved boat trailer for enabling a single operator to load and unload marine craft. The boat trailer includes an extendible tongue allowing it to be submersed by a conventional motor vehicle. The trailer includes laterally separated guide posts adjacent the rear of the trailer and a forward sliding mooring hook assembly. When the trailer is backed into the water, the boat is free to float off the trailer as a slide member supporting the front end of the boat slides upwardly along a slide channel. When loading the boat onto the trailer, the boat is moved into position over the trailer and the fore end of the boat is fastened to the slide member. As the boat is withdrawn from the water, the boat settles onto the trailer in registry with supporting members being guided by the freely moving slide member and the laterally separated guide posts.

9 Claims, 3 Drawing Sheets

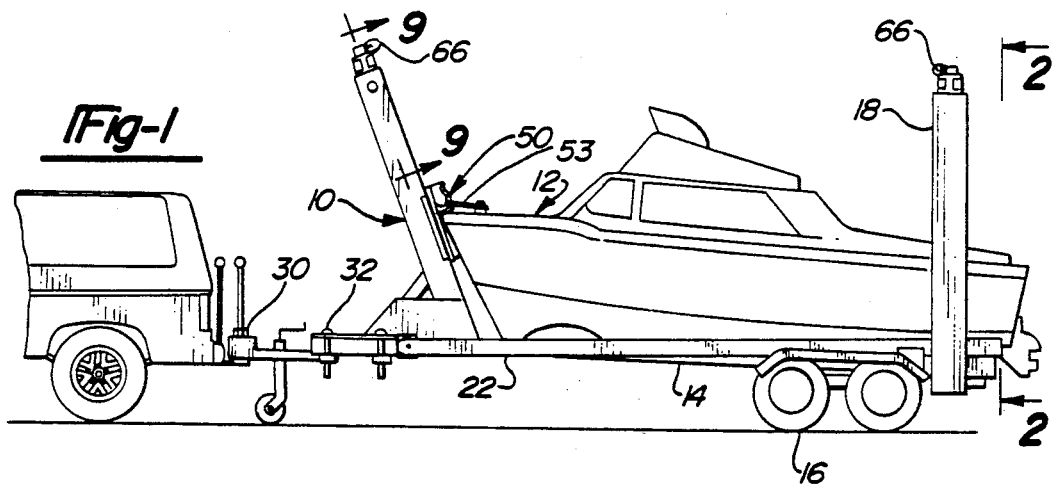
Fig-1
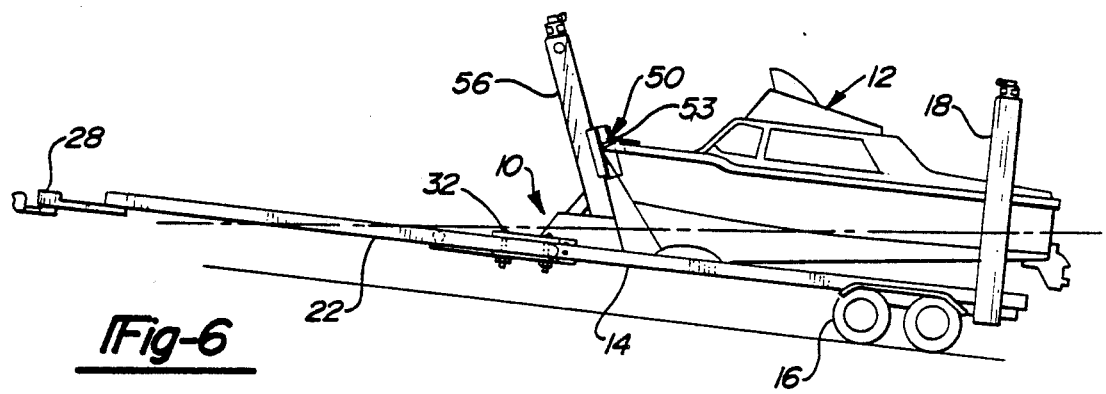
Fig-6
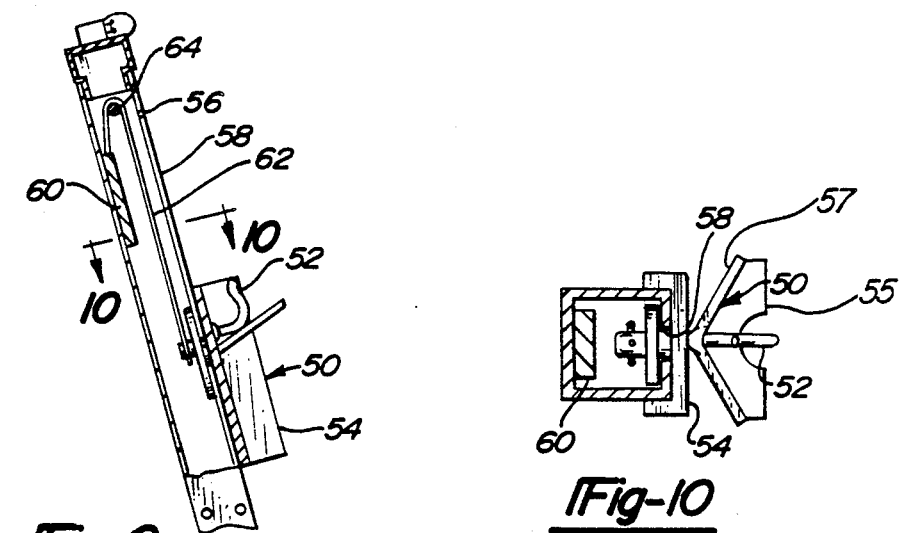
Fig-9
Fig-10

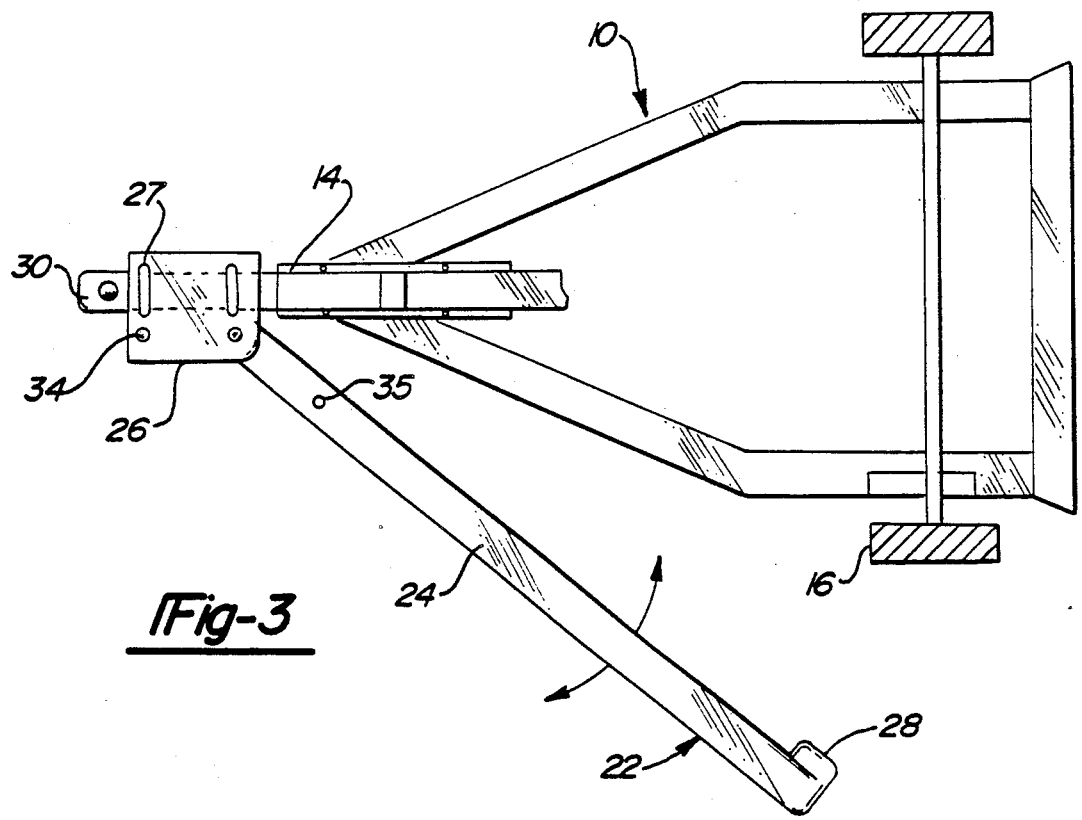
_Fig-3_
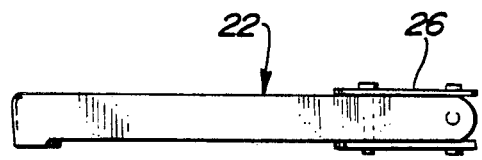
_Fig-4_
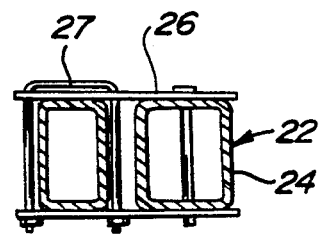
_Fig-5_

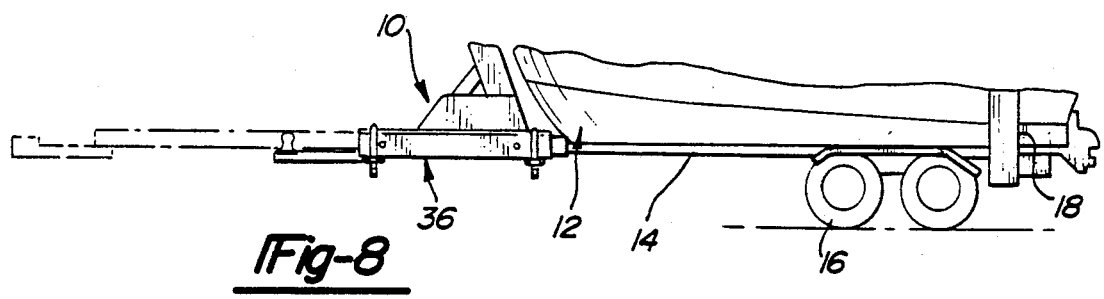
Fig-8
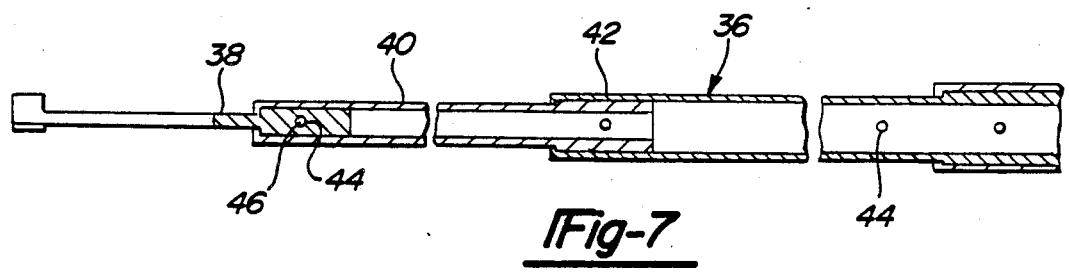
Fig-7
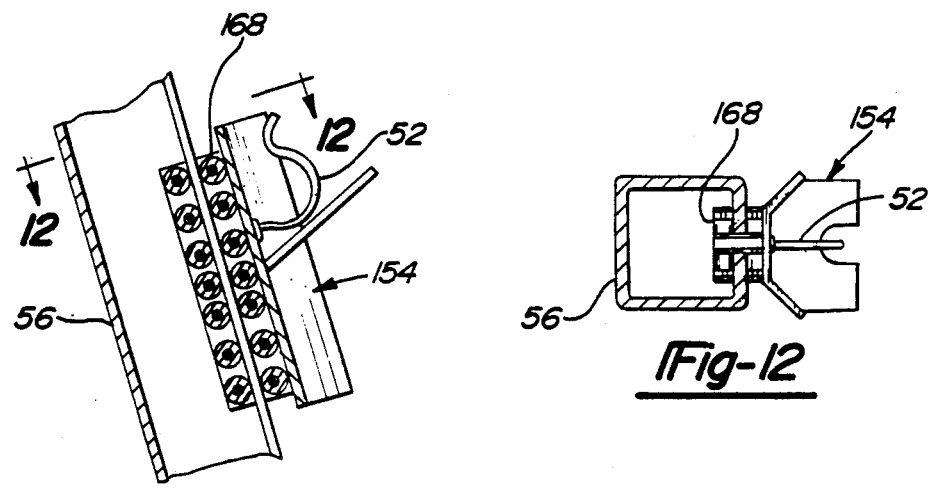
Fig-11
Fig-12
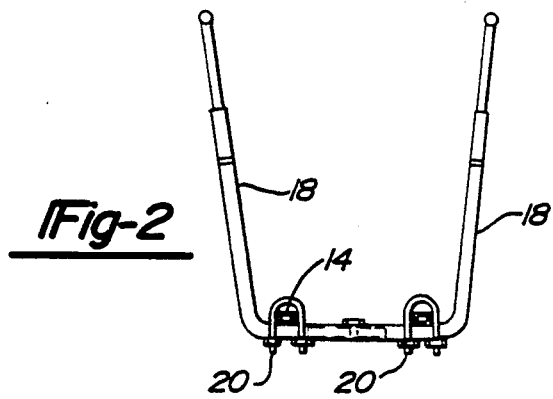
Fig-2

BOAT TRAILER OR KIT

This is a continuation of U.S. patent application Ser. No. 369,609 filed Jun. 21, 1989, now abandoned entitled "Improved Boat Trailer or Kit".

BACKGROUND AND SUMMARY OF THE INVENTION

This invention relates to a motor vehicle trailer and particularly to one adapted for transporting, unloading and loading marine craft.

Many boat owners store and transport their boats using a towed trailer. For larger boats, their size and weight makes them difficult for an individual to safely load and unload them between the water and trailer. In accordance with conventional designs, a trailer is provided with a forward located winch. The operator backs the trailer into the water and then slowly pays out the winch line enabling the boat to gradually slide into the water. When loading the boat, the process is reversed requiring the operator to operate the winch to pull the boat out of the water and onto the trailer which requires considerable effort. During the time that the boat is being loaded, another individual is needed to guide the boat to control its position on the trailer when being unloaded to prevent the boat from contacting nearby obstacles.

In accordance with the present invention, a boat trailer is provided which enables a single operator to load and unload even extremely large boats with ease. This invention would allow an individual to enjoy boating without requiring the assistance of others as is currently necessary. The above features of the present invention are achieved through the use of an extendible tongue trailer which enables the trailer to be backed deeply into the water in conjunction with a novel sliding mooring hook at the forward end of the trailer which supports and guides the fore end of the boat. A pair of upstanding guide posts support the sides of the boat to control lateral movement of the boat during loading and unloading. Additional aids for loading and unloading a boat and for aligning a trailer and car are also provided by this invention.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a side elevational view of the improved boat trailer according to this invention shown carrying a boat and being towed by a vehicle.

FIG. 2 is a partial side view showing the guide posts of the trailer shown in FIG. 1.

FIG. 3 is a top view of the improved boat trailer shown in FIG. 1 showing an extendible tongue according to a first embodiment of this invention being moved between stowed and extended positions.

FIG. 4 is a side view of the hinge plate for the extendible tongue and universal joint shown in FIG. 3.

FIG. 5 is a cross-sectional view through the hinge plate shown in FIG. 3 when the extendible tongue is in its extended position.

FIG. 6 is a side elevational view of the improved position.

FIG. 7 is a cross-sectional view through an extendible tongue according to a second embodiment of this invention having telescoping sections.

FIG. 8 is a partial side elevational view of the telescoping extendible tongue design.

FIG. 9 is a cross-sectional view taken along line 9—9 of FIG. 1 showing the internal configuration of the slide channel of this invention.

FIG. 10 is a cross-sectional view taken along line 10—10 of FIG. 9.

FIG. 11 is a cross-sectional view through the slide channel showing a sliding mooring hook assembly according to a second embodiment of this invention incorporating roller bearing elements.

FIG. 12 is a cross-sectional view taken along line 12—12 of FIG. 11.

DETAILED DESCRIPTION OF THE INVENTION

With reference to the drawings, FIG. 1 illustrates an improved boat trailer according to this invention generally designated by reference number 10 shown with an example boat 12 being carried thereon. Boat trailer 10 generally comprises a lower frame 14 with road wheels 16. A pair of telescoping laterally separated boat guide posts 18 are provided at the rear end of trailer 10 and support the sides of the boat. Means are preferably provided (not shown) for enabling the lateral spacing between guide posts 18 to be adjusted to accommodate various boats.

In accordance with one feature of the present invention, boat trailer 10 includes an extendible tongue assembly generally designated by reference number 22 best shown with reference to FIGS. 3 through 5. In accordance with a first embodiment, extendible tongue includes channel 24 which is attached to frame 1 by hinge plate 26 which is attached to frame 14 by "U" bolts 27. FIG. 1 shows extendible tongue 22 in a stowed folded back configuration in which the hitch cup 28 is stowed over road wheel 16. This configuration for extendible tongue 22 is particularly adapted for use with an existing trailer having a conventional forward mounted hitch cup 30. When it is desired to extend tongue 22, cup 28 is unhitched from its stowed position and channel 24 is rotated about hinge plate 26 until it is positioned in front of trailer 10, as shown in FIG. 6. In that position, support pin 32 passing through holes 34 and 35 is used to fix the tongue position. FIGS. 4 and 5 show the positioning of the elements when the tongue is extended. Universal joint 37 is provided to act as a hinge to enable the tongue to be easily moved between positions.

FIGS. 7 and 8 illustrate extendible tongue 36 according to a second embodiment of this invention. Extendible tongue 36 has a telescoping configuration and can be used to replace a conventional hitch cup used for trailer towing. FIG. 7 shows extendible tongue 36 in its extended position. FIG. 8 shows the tongue in both normal and extended positions (in full and phantom lines, respectively). Tongue 36 includes relatively telescoping sections 38, 40 and 42. Sections 38, 40 and 42 include aligned pin holes 44. In the retracted position, a pair of pins 46 are dropped through the aligned pin holes 44 enabling the trailer to be towed in a conventional fashion. When it is desired to extend tongue 36, pins 46 are removed, thus permitting the sections 38, 40 and 42 to be extended relative to each other. When the sections are fully extended, pins 46 can be reinstalled.

Sections 38, 40 and 42 preferably include means to prevent them from becoming disassembled through excessive extension, such as the enlarged ends shown in FIG. 7.

Referring again to FIG. 1 and also to FIGS. 9 and 10, another principal feature of this invention is the use of a sliding mooring hook assembly 50. Hook assembly 50 includes an engaging hook 52 which is configured to interengage with a loop of rope 53 attached to the forward mooring hook ordinarily found on boats. Plate 55 serves to position engaging hook 52 above the deck surface of the boat as shown in FIG. 1. "V" shaped shield 57 restrains the bow of the boat from lateral movement once the boat is secured to hook assembly 50. Hook assembly 50 includes slide 54 which supports hook 52 which is movable along slide channel 56. A longitudinal gap 58 is provided along slide channel 56 which accommodates movement of slide 54. For the reasons which will be described in more detail below, it is desirable to normally bias slide 54 to the upward extreme position along slide channel 56. Such biasing can be provided by numerous approaches.

In FIGS. 9 and 10, counterweight 60 is used within slide channel 56 and provides the desired upward biasing of slide 54 through cable 62 wrapping over pulley 64. Numerous other biasing approaches could be employed with equal success, such as resilient means using various types of springs. In another alternate construction, a float could be affixed to slide 54 so that it is normally maintained at water level. In FIGS. 11 and 12, a modified slide 154 is shown having roller bearings 168 for providing free movement of the slide.

Guide posts 18 are provided which laterally encompass boat 12 and serve as guides as will be better explained below. Guide posts 18 are preferably extendible upwardly so that they can guide boat 12 even when trailer 10 is submerged. Lights 66 can be provided at the upper ends of guide posts 18 and slide channel 56 to facilitate alignment of the boat during loading.

Use of improved boat trailer 10 will now be described with reference to the figures. When the boat is being transported by the trailer, the bow is secured laterally by shield 57 and vertically by hook 52 and plate 55. When the operator desires to unload boat 12 into the water, extendible tongue 22 or 36 is moved to its extended position. Any restraining means used for supporting boat 12 during road transportation is released and trailer 10 with boat 12 are backed into the water. Due to the extension of the tongue, trailer 10 can be nearly fully submersed. As the trailer 10 is backed into the water, boat 12 becomes supported by the water and can float off trailer 10. Sliding mooring hook assembly 50 allows the boat to float freely while continuing to maintain control over the position of the boat. While trailer 10 is submersed, guide posts 18 are preferably extended so that they continue to embrace the lateral sides of boat 12 to provide additional stability and control over the boat. The operator then simply unhooks loop 53 from hook 52 and the boat can be pushed or powered out of engagement with trailer 10. Thereafter, trailer 10 can be removed from the water and stored. Preferably the extendible tongues would thereafter be retracted to reduce parking space required.

When the operator wishes to load boat 12 onto trailer 10 after boating, the extendible tongues are first extended and the trailer is backed into the water so that it is substantially submersed. Next, the operator guides the boat into the proper position over trailer 10. Again, guide posts 18 support the boat to properly position it as it is being guided onto the trailer. Once in the proper position, loop 53 is attached to hook 52, which can be done from the boat deck without the operator entering the water. As loop 53 is tightened, the boat deck is drawn into contact with the lower surface of plate 55. As mentioned previously, slide 54 is biased either through compliant means, counterweights or by a float so that the operator can conveniently access it to attach it to the boat. The trailer is then simply driven out of the water. As trailer 10 is withdrawn from the water, the boat gradually settles onto trailer 10 into proper registry with members for supporting the boat hull. Slide 54 travels downwardly along slide channel 56 as the boat is settling onto the trailer and maintains the proper position of the boat during this process. Finally the trailer and boat can be removed from the water and any additional restraining means can be fastened for road travel. Extendible tongue 22 or 36 is moved to its retracted position to accommodate road transportation.

Another feature of the present invention is the provision of alignment posts 80 and 82 which are attached permanently to the car hitch and tailer 10, or can be temporarily attached by clamps, magnets, etc. Balls 84 and 86 are set to be aligned when the vehicle is positioned to allow loading of the trailer onto the hitch ball. Balls 84 and 86 can be illuminated to aid visibility. Leveling devices can be added to insure that alignment of the balls will correspond to alignment of the hitch components. Posts 80 and 82 can be made to telescope so they can be collapsed for convenient storage, and extended to a desired length for best visibility. These features allow an operator to precisely back up the vehicle to hook-up a trailer without guess work or another person.

While the above description constitutes the preferred embodiment of the present invention, it will be appreciated that the invention is susceptible to modification, variation and change without departing from the proper scope and fair meaning of the accompanying claims.

I claim:

1. A boat trailer for enabling transportation of a boat and adapted to be towed by a motor vehicle comprising:
   means for connecting said trailer to said motor vehicle,
   channel means at a forward end of said trailer and extending upwardly from said trailer in a substantially vertical direction,
   sliding mooring hook means for traveling along said channel means in a substantially vertical direction for connection to said boat said sliding mooring hook means moveable from a first position along said channel means while attached to said boat when said boat is floating over said trailer with the bow of said boat unsupported by said trailer to a displaced downward second position along said channel means while attached to said boat when said boat bow is supported by said trailer
   biasing means for biasing said sliding hook means in a position at or above water level wherein during loading of said boat said biasing means allows said sliding hook means to be easily secured to bow of said boat and said sliding mooring hook means allows said boat to settle into desired support position on said trailer and during unloading of said boat said biasing means ensures that sliding hook mooring means allows said boat to float freely while continually maintaining control over position of said boat, lateral support post means affixed to said trailer for restraining lateral motion of said boat during loading and unloading of said boat, wherein during loading of said boat as said sliding mooring hook means moves downwardly along said channel means from said first to said second position while attached to said boat said lateral support post means guides said boat floating in water into a desired support position on said trailer as the trailer and boat are withdrawn from the water and during unloading of said boat, said lateral support post means restrain said boat as said trailer is moved into the water causing said boat to float in the water as said sliding mooring hook means moves from said second to said first position.

2. A boat trailer according to claim 1 further comprising an extendible tongue assembly for permitting varied during said boat loading and unloading and when said trailer is being towed behind said vehicle.

3. A boat trailer according to claim 2 wherein said extendible tongue includes a bar affixed to a hinge plate mounted to a forward end of said trailer and including hinge means allowing said bar to be moved from a normal retracted position to a forward extending position for engaging said motor vehicle.

4. A boat trailer according to claim 3 wherein said hinge plate is removably affixed to said trailer.

5. A boat trailer according to claim 2 wherein said extendible tongue assembly comprises a plurality of relatively telescoping sections with means for maintaining said sections in an extended or retracted condition.

6. A boat trailer according to claim 1 wherein said lateral support posts are affixed to said boat trailer through fastening means engaging said trailer frame.

7. A boat trailer according to claim 1 wherein said sliding mooring hook means moves within a longitudinal slot within said channel means.

8. A boat trailer according to claim 7 wherein said means for biasing said sliding mooring hook means comprises a counterweight acting on said mooring hook means.

9. A boat trailer according to claim 7 wherein said sliding mooring hook means further comprises roller bearing elements acting on said channel for reducing friction of motion of said sliding hook means.

* * * * *

UNITED STATES PATENT AND TRADEMARK OFFICE
CERTIFICATE OF CORRECTION

PATENT NO. : 5,114,168
DATED : May 19, 1992
INVENTOR(S) : Charles W. Kehl It is certified that error appears in the above-identified patent and that said Letters Patent is hereby corrected as shown below:

Column 1, line 67, after the word "improved", insert --boat trailer shown in Fig. 1 with the tongue in an extended--.

Column 5, line 19, claim 2, after "permitting", insert --the distance between said boat and said motor vehicle to be --.

Signed and Sealed this

Thirteenth Day of July, 1993

Attest:

MICHAEL K. KIRK

*Attesting Officer*  Acting Commissioner of Patents and Trademarks